United States Patent
Hita (10) Patent No.: US 12,129,897 B2
(45) Date of Patent: Oct. 29, 2024

(54) CLUTCH MECHANISM AND POWER TOOL

(71) Applicant: NITTO KOHKI CO., LTD., Tokyo (JP)

(72) Inventor: Hirokazu Hita, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 419 days.

(21) Appl. No.: 17/730,799

(22) Filed: Apr. 27, 2022

(65) Prior Publication Data

US 2022/0252113 A1 Aug. 11, 2022

Related U.S. Application Data (63) Continuation of application No. PCT/JP2020/034445, filed on Sep. 11, 2020.

(30) Foreign Application Priority Data

Oct. 28, 2019 (JP) ................................. 2019-195448

(51) Int. Cl.
 *B25F 5/00* (2006.01)
 *F16D 7/08* (2006.01)
 *F16D 43/206* (2006.01)

(52) U.S. Cl.
 CPC ............ *F16D 43/206* (2013.01); *B25F 5/001* (2013.01); *F16D 7/08* (2013.01)

(58) Field of Classification Search
 CPC ........... F16D 43/206; F16D 7/08; B25F 5/001
 (Continued)

(56) References Cited

U.S. PATENT DOCUMENTS

| 4,838,400 A | * | 6/1989 | Fortune | F16D 43/206 464/36 |
| 5,868,231 A | * | 2/1999 | Kampf | F16D 43/206 192/56.62 |

(Continued)

FOREIGN PATENT DOCUMENTS

| GB | 2069073 | 8/1981 |
| JP | S56120828 | 9/1981 |

(Continued)

OTHER PUBLICATIONS

Office Action issued in corresponding DE Application 11 2020 005 195.1, issued Jan. 10, 2023, 10 pages.

(Continued)

*Primary Examiner* — Greg Binda
(74) *Attorney, Agent, or Firm* — Burris Law, PLLC (57) ABSTRACT

A clutch mechanism includes a first clutch plate retaining circular columnar engagement members and a second clutch plate retaining spherical engagement members. In the second clutch plate, inner retaining holes and outer retaining holes positioned more radially outward than the inner retaining holes are formed. The outer retaining holes are larger in diameter than the inner retaining holes. On assembly of the clutch mechanism, engagement members are selected from small-diameter spherical engagement members corresponding to the small-diameter inner retaining holes and large-diameter spherical engagement members corresponding to the large-diameter inner retaining holes. The selected engagement members are disposed in the corresponding retaining holes, respectively. The maximum rotational torque is greater when the large-diameter spherical engagement members are selectively disposed than when the small-diameter spherical engagement members are selectively disposed.

6 Claims, 10 Drawing Sheets

(58) Field of Classification Search
USPC .......................................... 464/36; 192/56.62
See application file for complete search history.

(56) References Cited

U.S. PATENT DOCUMENTS

| | | |
|---|---|---|
| 9,039,538 B2 | 5/2015 | Kohuth et al. |
| 2014/0073440 A1 | 3/2014 | Brunazzi et al. |
| 2018/0147712 A1 | 5/2018 | Hita |

FOREIGN PATENT DOCUMENTS

| | | | | |
|---|---|---|---|---|
| JP | 1984105375 | | 7/1984 | |
| JP | 1990019479 | | 2/1990 | |
| JP | 5-164154 A | * | 6/1993 | ............ 464/36 |
| JP | H07037817 | | 4/1995 | |
| JP | 4563812 | | 10/2010 | |
| JP | 2015227675 | | 12/2015 | |
| JP | 2017042878 | | 3/2017 | |
| SU | 1471000 A1 | * | 4/1989 | ............ 464/36 |
| SU | 1700306 A1 | * | 12/1991 | ............ 464/36 |
| WO | 2004024398 | | 3/2004 | |
| WO | 2017038846 | | 3/2017 | |

OTHER PUBLICATIONS

International Search Report for corresponding International Application PCT/JP2020/034445, mailed Nov. 17, 2020.

* cited by examiner

CLUTCH MECHANISM AND POWER TOOL

CROSS-REFERENCE TO RELATED APPLICATIONS

This application is a continuation of International Application No. PCT/JP2020/034445, filed on Sep. 11, 2020, which claims priority to and the benefit of Japanese Patent Application No. 2019-195448, filed on Oct. 28, 2019. The disclosures of the above applications are incorporated herein by reference.

FIELD

The present disclosure relates to a clutch mechanism for limiting the rotational torque transmitted from an input shaft to an output shaft, and also relates to a power tool including a clutch mechanism.

BACKGROUND

Among power tools such as an electric motor-driven screwdriver having an electric motor as a drive unit and an air drill having an air motor as a drive unit, there is a power tool having a clutch mechanism provided between a rotating drive shaft of a drive unit and an output shaft fitted with a machining tool such as a screwdriver bit or a drill bit to limit the maximum rotational torque applied to the output shaft from the drive unit (WO2017/038846, Japanese Patent Application Publication No. 2017-42878). For example, if an electric motor-driven screwdriver is provided with a clutch mechanism to limit the rotational torque applied to a screw through a screwdriver bit, damage to the screw can be prevented. It is also possible to stop the drive of a motor or to count the number of screws tightened by judging completion of a screw tightening operation when the clutch mechanism releases the driving connection in response to a rapid increase in rotational torque resulting from seating of the screw.

For example, the clutch mechanism provided in the above-described electric motor-driven screwdriver includes a clutch ball disposed on the output shaft side so that the clutch ball is engageable with a projection of a rotating drive shaft-side clutch member in the rotational direction. The clutch ball is urged toward the clutch member side by a spring to maintain a state where the clutch ball is engaged with the projection. While the clutch ball is engaged with the projection in the rotational direction, a rotational torque is transmitted from the rotating drive shaft to the output shaft. When an excessive rotational torque acts, the clutch ball is displaced in the direction of the rotation axis against the urging force of the spring to cancel the engagement between the clutch ball and the projection in the rotational direction, thereby canceling the transmission of the rotational torque.

SUMMARY

The maximum rotational torque that the clutch mechanism can transmit depends, for example, on the urging force of the spring, the amount of displacement of the clutch ball when the clutch mechanism is released, and the position in the radial direction at which the clutch ball engages the projection of the clutch member. Therefore, the maximum rotational torque that the clutch mechanism can transmit can be changed by changing the size or disposition of the clutch ball, for example. It is, however, impossible to replace the clutch ball with another of different size because the size of a retaining hole for retaining the clutch ball is usually set in conformity with the size of the clutch ball. Further, because the position of the clutch ball is determined by the position of the retaining hole, the position of the clutch ball cannot be shifted. Accordingly, it is necessary, in order to structure clutch mechanisms with different maximum rotational torque, to prepare a plurality of different types of members having clutch ball-retaining holes formed with different sizes and/or at different positions and to selectively use the prepared members in conformity with the required maximum rotational torque. Consequently, the number of different types of components to be prepared increases, resulting in an increase in cost. In addition, when the maximum rotational torque is to be changed afterward, it is necessary to replace not only the clutch ball but also a member for retaining the clutch ball, resulting in a complicated operation.

Under these circumstances, an object of the present disclosure is to provide a clutch mechanism enabling the maximum transmissible rotational torque to be changed without changing a component retaining an engagement member (clutch ball) and also to provide a power tool including such a clutch mechanism.

That is, the present disclosure provides a clutch mechanism configured to be disposed between an input shaft and an output shaft to limit a rotational torque transmitted from the input shaft to the output shaft, the clutch mechanism including the following: a first clutch plate configured to be drivably connected to one of the input shaft and the output shaft, the first clutch plate being disposed to be rotatable about a rotation axis and having an engagement projection projecting in the direction of the rotation axis; a second clutch plate configured to be drivably connected to the other of the input shaft and the output shaft, the second clutch plate being disposed to face the first clutch plate in the direction of the rotation axis and to be rotatable about the rotation axis, the second clutch plate having an inner retaining hole extending therethrough in the direction of the rotation axis and an outer retaining hole extending therethrough in the direction of the rotation axis, the outer retaining hole being positioned more radially outward than the inner retaining hole; an engagement member selectively disposed in one retaining hole of the inner retaining hole and the outer retaining hole, the engagement member being retained in the one retaining hole so as to be displaceable in the direction of the rotation axis; and a slide member abutting against the engagement member in the direction of the rotation axis to press the engagement member toward the first clutch plate. The clutch mechanism is configured to be transmit a rotational torque between the first clutch plate and the second clutch plate through engagement of the engagement member with the engagement projection in a rotational direction. When a load equal to or greater than a predetermined maximum rotational torque acts, the engagement projection causes the engagement member to be displaced in the direction of the rotation axis, together with the slide member, so as to cancel the engagement between the engagement projection and the engagement member in the rotational direction, thereby canceling transmission of the rotational torque. The maximum rotational torque is greater when the engagement member is selectively disposed in the outer retaining hole than when the engagement member is selectively disposed in the inner retaining hole.

In the clutch mechanism, an inner retaining hole and an outer retaining hole positioned more radially outward than the inner retaining hole are formed in the second clutch plate, and an engagement member is selectively disposed in one of the inner retaining hole and the outer retaining hole. By simply choosing whether to dispose the engagement member in the inner retaining hole or the outer retaining hole on assembly, it is possible to change the maximum rotational torque that the clutch mechanism can transmit, without replacing the second clutch plate.

Further, the arrangement may be as follows. The outer retaining hole has a diameter larger than that of the inner retaining hole, and the engagement member is a spherical engagement member selected from a small-diameter spherical engagement member corresponding to the inner retaining hole and a large-diameter spherical engagement member larger in diameter than the small-diameter engagement member and corresponding to the outer retaining hole so that the selected spherical engagement member corresponds to the one retaining hole.

With the above-described arrangement, the difference between settable maximum rotational torques can be increased even more, although it is necessary to prepare spherical engagement members of different sizes.

Further, the arrangement may be as follows. The first clutch plate has an inner engagement surface configured to engage the small-diameter spherical engagement member when the small-diameter spherical engagement member is disposed in the inner retaining hole, and an outer engagement surface configured to engage the large-diameter spherical engagement member when the large-diameter spherical engagement member is disposed in the outer retaining hole, the inner engagement surface projecting toward the second clutch plate more than the outer engagement surface by an amount corresponding to the difference in diameter between the small-diameter spherical engagement member and the large-diameter spherical engagement member.

In addition, the present disclosure provides a clutch mechanism configured to be disposed between an input shaft and an output shaft to limit a rotational torque transmitted from the input shaft to the output shaft, the clutch mechanism including the following: a first clutch plate configured to be drivably connected to one of the input shaft and the output shaft, the first clutch plate being disposed to be rotatable about a rotation axis and having an engaging projection projecting in the direction of the rotation axis; a second clutch plate configured to be drivably connected to the other of the input shaft and the output shaft, the second clutch plate being disposed to face the first clutch plate in the direction of the rotation axis and to be rotatable about the rotation axis, the second clutch plate having a small-diameter retaining hole extending therethrough in the direction of the rotation axis and a large-diameter retaining hole extending therethrough in the direction of the rotation axis, the large-diameter retaining hole having a diameter larger than that of the small-diameter retaining hole; an engagement member selected from a small-diameter engagement member corresponding to the small-diameter retaining hole and a large-diameter engagement member corresponding to the large-diameter retaining hole, the large-diameter engagement member having a diameter larger than that of the small-diameter engagement member, the engagement member being disposed in a corresponding one of the small-diameter retaining hole and the large-diameter retaining hole and retained in the corresponding retaining hole so as to be displaceable in the direction of the rotation axis; and a slide member abutting against the engagement member in the direction of the rotation axis to press the engagement member toward the first clutch plate. The clutch mechanism is configured to transmit a rotational torque between the first clutch plate and the second clutch plate through engagement of the engagement member with the engagement projection in a rotational direction. When a load equal to or greater than a predetermined maximum rotational torque acts, the engagement projection causes the engagement member to be displaced in the direction of the rotation axis, together with the slide member, so as to cancel the engagement between the engagement projection and the engagement member in the rotational direction, thereby canceling transmission of the rotational torque. The maximum rotational torque is greater when the large-diameter engagement member is selectively disposed in the large-diameter retaining hole than when the small-diameter engagement member is selectively disposed in the small-diameter retaining hole.

In the clutch mechanism, a small-diameter retaining hole and a large-diameter retaining hole having a diameter larger than that of the small-diameter retaining hole are formed in the second clutch plate, and one of a small-diameter engagement member and a large-diameter engagement member is selectively disposed in the corresponding retaining hole. By simply choosing whether to dispose the small-diameter engagement member in the small-diameter retaining hole or to dispose the large-diameter engagement member in the large-diameter retaining hole on assembly, it is possible to change the maximum rotational torque that the clutch mechanism can transmit, without replacing the second clutch plate.

In addition, the present disclosure provides a power tool including the following: a drive unit having an input shaft; an output shaft having a tool mounting part to which a machining tool is to be mounted; and the above-described clutch mechanism disposed between the input shaft and the output shaft.

DRAWINGS

Embodiments of a power tool according to the present disclosure will be explained below on the basis of the accompanying drawings.

FIG. 4 is an enlarged view of the clutch mechanism and its surroundings showing a state where a cylindrical shaft portion of an output shaft has been pushed in.

DETAILED DESCRIPTION

Figure 1:
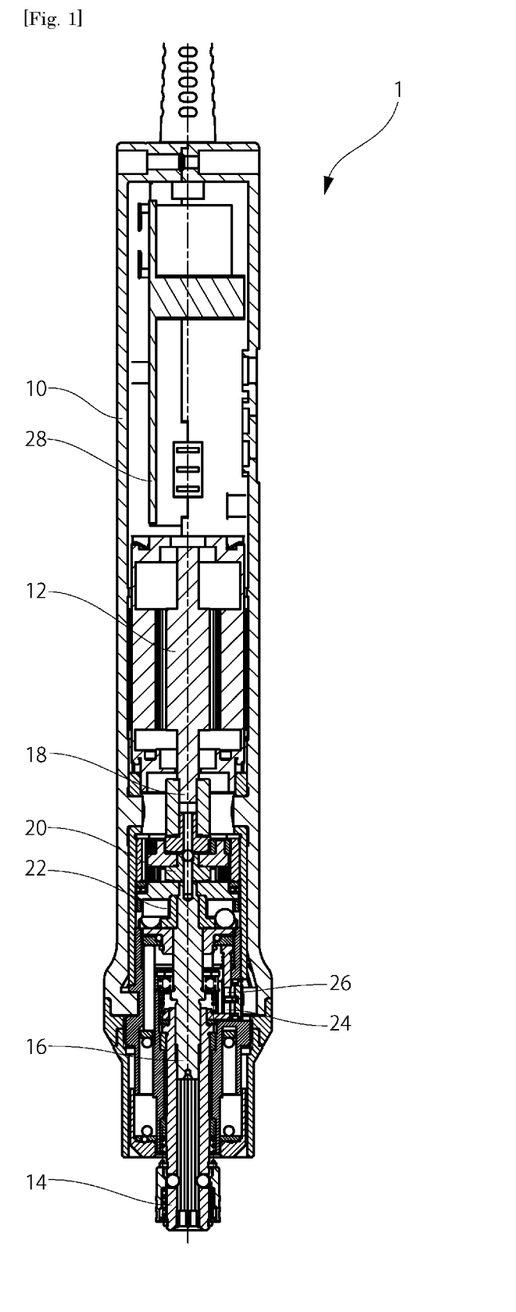
FIG. 1 is a sectional view of an electric motor-driven screwdriver according to an embodiment of the present disclosure.

As shown in FIG. 1, an electric motor-driven screwdriver (power tool) 1 according to an embodiment of the present disclosure includes a tool housing 10, an electric motor (drive unit) 12 disposed in the tool housing 10, an output shaft 16 having a tool mounting part 14 to which a screwdriver bit (machining tool) is to be detachably mounted, a planetary gear mechanism 20 configured to transmit the rotation of a rotating drive shaft (input shaft) 18 of the electric motor 12 while reducing the speed thereof, and a clutch mechanism 22 disposed between the planetary gear mechanism 20 and the output shaft 16. The rotational torque of the electric motor 12 is transmitted to the output shaft 16 through the planetary gear mechanism 20 and the clutch mechanism 22. The tool housing 10 is further provided therein with a starting photoelectric sensor 24 for starting the drive of the electric motor 12 and a braking photoelectric sensor 26 for stopping the drive of the electric motor 12. The drive and stop of the electric motor 12 are controlled based on the output values of the photoelectric sensors 24 and 26 as will be explained later.

Figure 2:
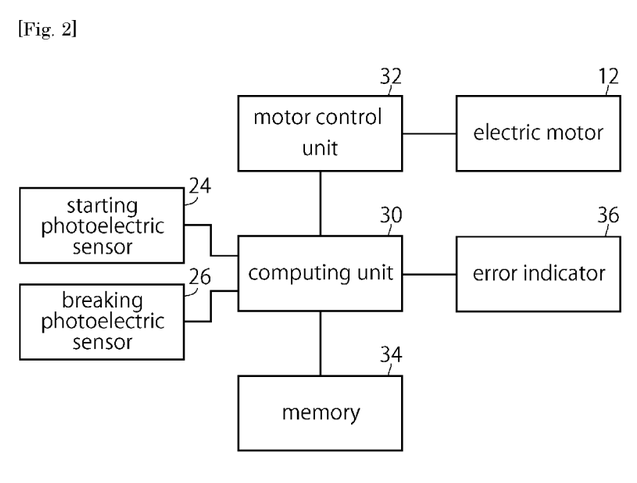
FIG. 2 is a functional block diagram of the electric motor-driven screwdriver shown in FIG. 1.

A control circuit 28 disposed in the tool housing 10 is, as shown in FIG. 2, provided with a computing unit 30, a motor control unit 32 for drive controlling the electric motor 12, and a memory 34 for storing a control program, control parameters, etc. The starting photoelectric sensor 24 and the braking photoelectric sensor 26 are connected to the computing unit 30, and the computing unit 30 controls the start and stop of the drive of the electric motor 12 on the basis of the output values of the starting photoelectric sensor 24 and the braking photoelectric sensor 26. In addition, the electric motor-driven screwdriver 1 includes an error indicator 36 disposed at a position easily seen by the worker. The error indicator 36 has an LED, and when some errors occur, the error indicator 36 indicates the error states to the worker by LED light emission. It should be noted that the starting photoelectric sensor 24 has a light-emitting part (not shown) and a light-receiving part 24a, which face each other, and that the light-receiving part 24a receives light emitted from the light-emitting part and outputs an output value corresponding to the amount of light received thereby. The braking photoelectric sensor 26 similarly has a light-emitting part (not shown) and a light-receiving part 26a, which face each other, and the light-receiving part 26a receives light emitted from the light-emitting part and outputs an output value corresponding to the amount of light received thereby. In this embodiment, the starting photoelectric sensor 24 and the braking photoelectric sensor 26 are each configured such that as the amount of light received by the light-receiving part 24a, 26a decreases, the output value increases correspondingly.

Figure 3:
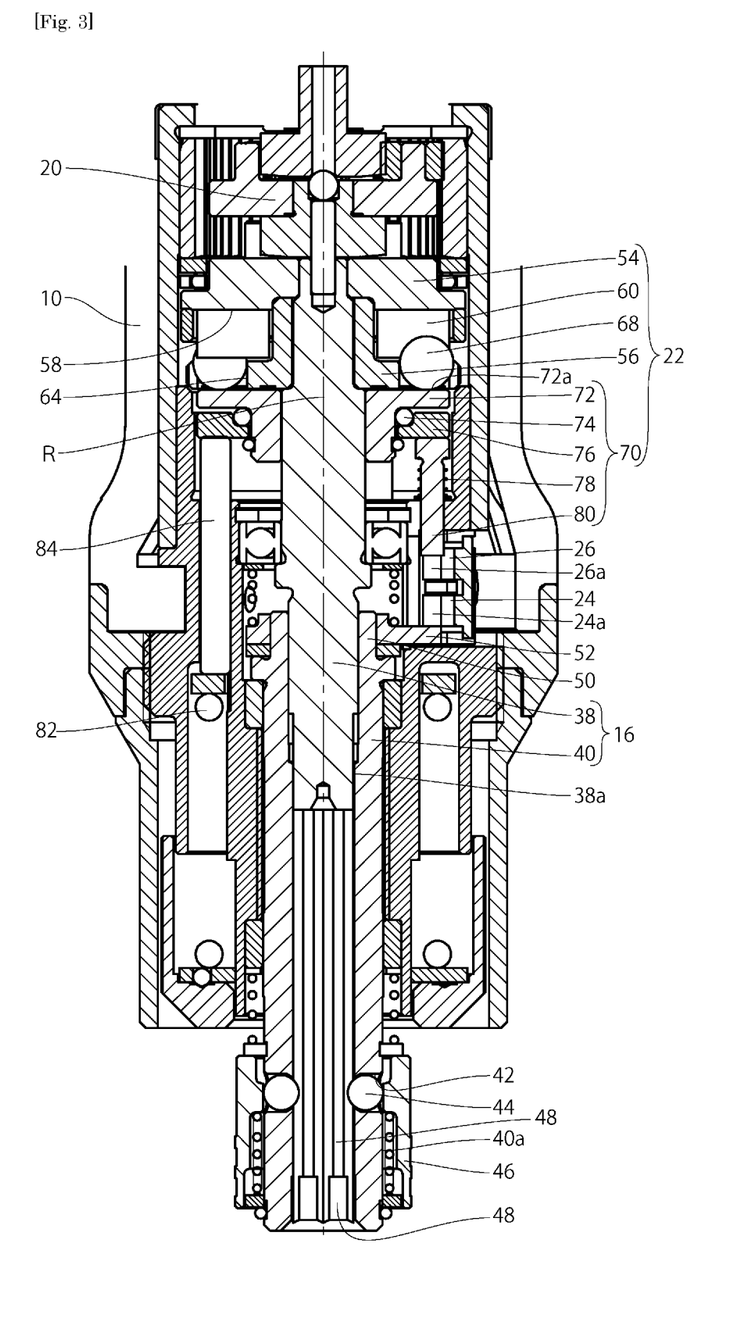
FIG. 3 is an enlarged view showing a clutch mechanism of the electric motor-driven screwdriver in FIG. 1 and the surroundings of the clutch mechanism.
Figure 4:
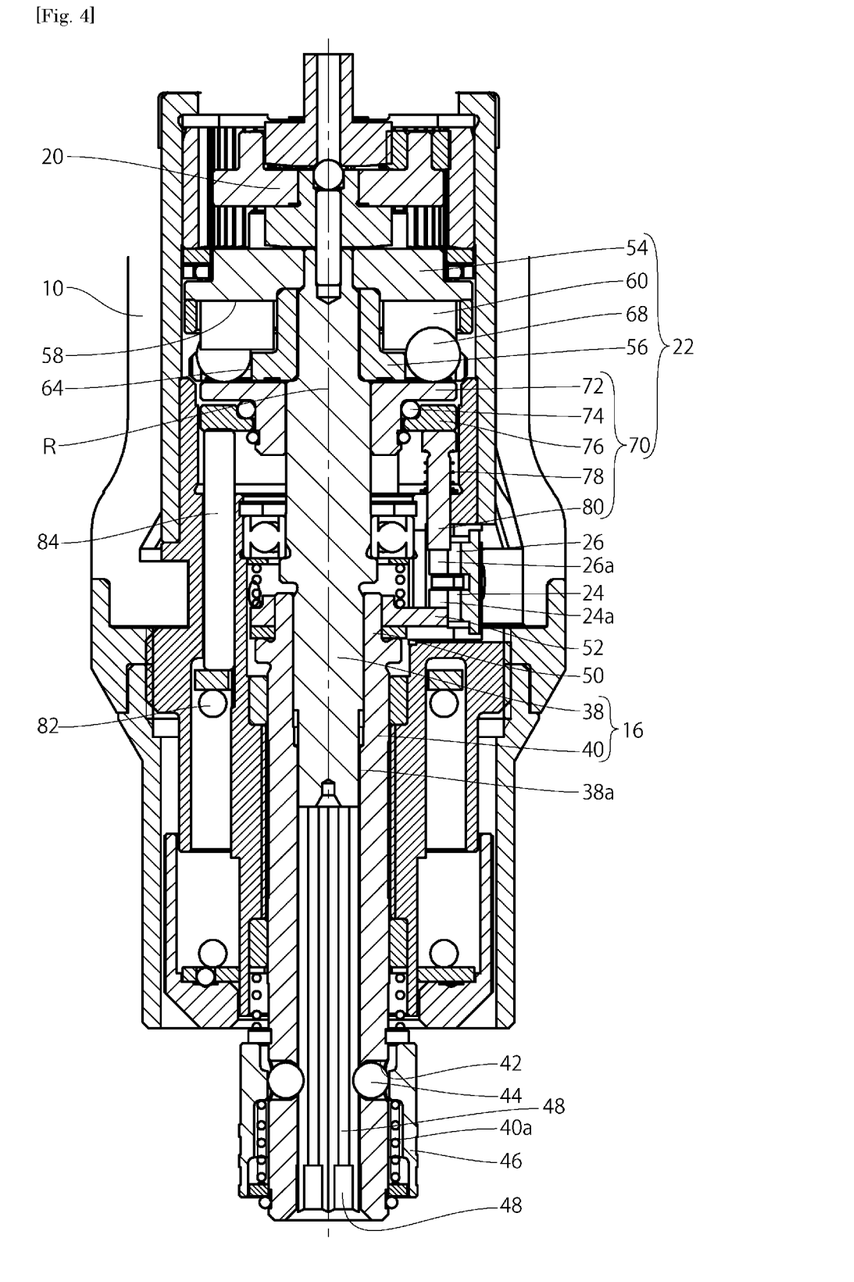

As shown in FIG. 3, the output shaft 16 comprises a solid shaft portion 38 connected to the clutch mechanism 22, and a cylindrical shaft portion 40 disposed so as to slide on an outer peripheral surface 38a of the solid shaft portion 38. The solid shaft portion 38 and the cylindrical shaft portion 40 are fixed in the rotational direction. Spherical locking elements 44 are disposed in locking element retaining holes 42 formed in the cylindrical shaft portion 40, and a sleeve 46 is disposed on an outer peripheral surface 40a of the cylindrical shaft portion 40. When the sleeve 46 is displaced from the illustrated position toward the distal end side (lower side as seen in the figure), the locking elements 44 are allowed to be displaced radially outward. If a screwdriver bit is inserted into an insertion hole 48 of the cylindrical shaft portion 40 in this state and the sleeve 46 is returned to the original position, the screwdriver bit is secured to the output shaft 16. Thus, the tool mounting part 14 of the output shaft 16 comprises the cylindrical shaft portion 40, the locking elements 44, and the sleeve 46. If the tool housing 10 is gripped in a state where the screwdriver bit is attached to the tool mounting part 14 and operated so that the screwdriver bit is pressed against a screw, the cylindrical shaft portion 40 of the output shaft 16 is pushed into the tool housing 10 as shown in FIG. 4. As the cylindrical shaft portion 40 is pushed in, a switch plate 52 disposed on a rear end portion 50 of the cylindrical shaft portion 40 is also displaced together with the cylindrical shaft portion 40. Consequently, the switch plate 52 enters between the light-emitting part and light-receiving part 24a of the starting photoelectric sensor 24 to partly block light emitted from the light-emitting part toward the light-receiving part 24a. As the amount of entry of the switch plate 52 increases, the amount of light received by the light-receiving part 24a decreases, and the output value of the starting photoelectric sensor increases. The computing unit 30 starts the drive of the electric motor 12 when receiving from the starting photoelectric sensor 24 an output value greater than a predetermined starting threshold value (a signal instructing of drive start).

Figure 5:
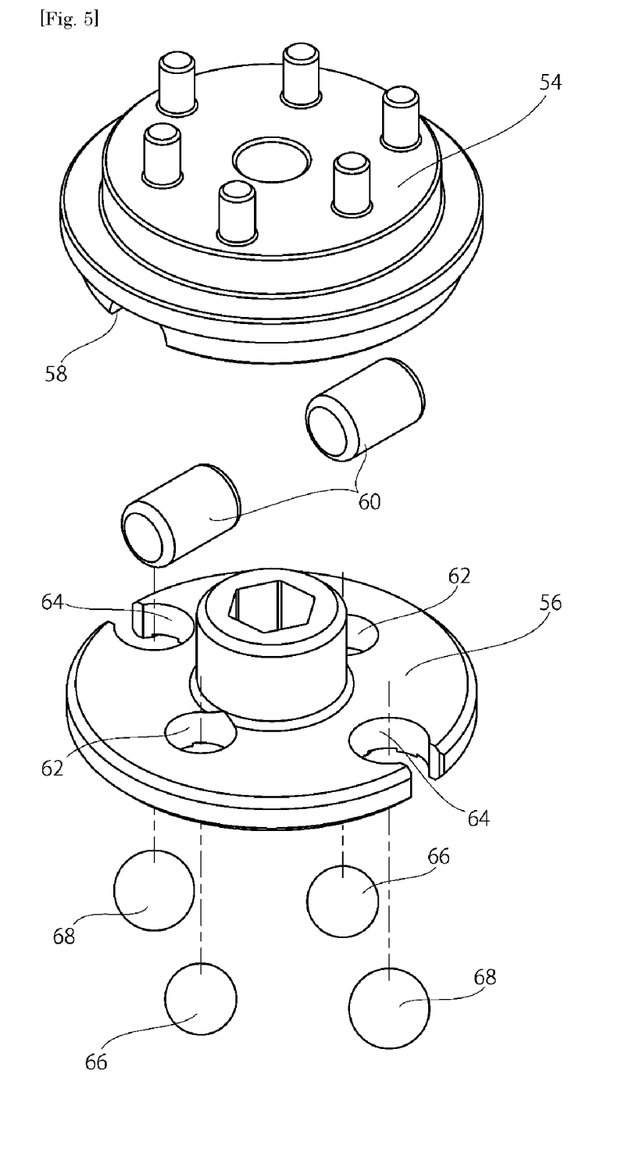
FIG. 5 is an exploded perspective view of components constituting the clutch mechanism as seen from above.
Figure 6:
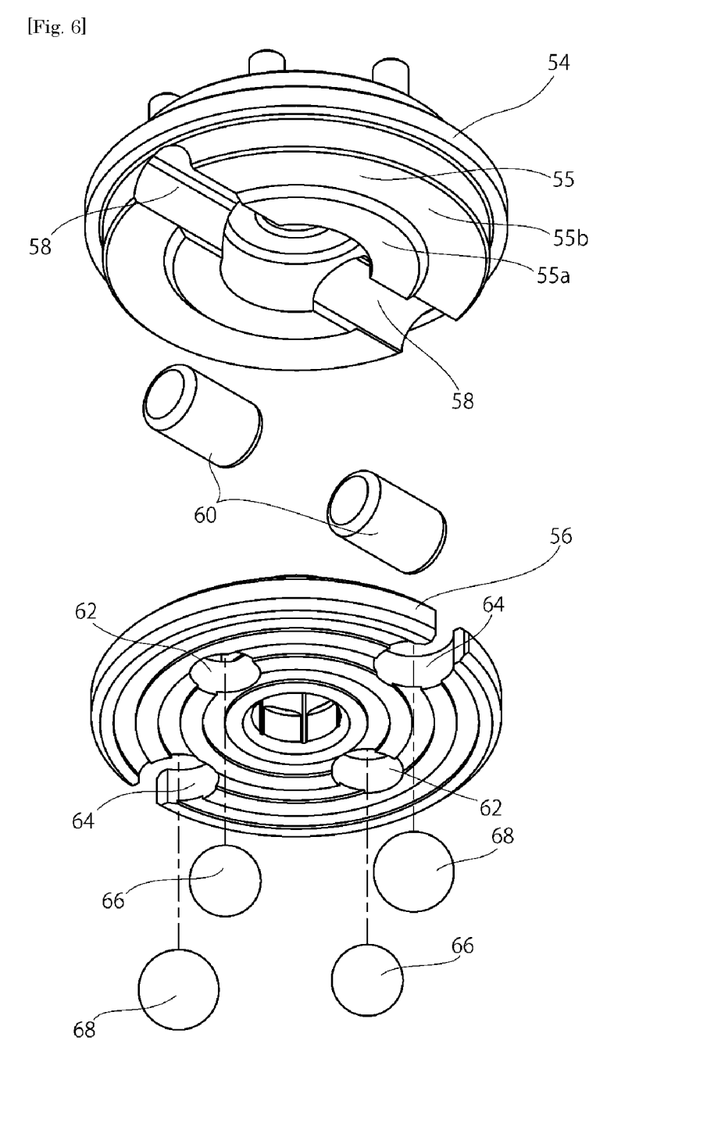
FIG. 6 is an exploded perspective view of components constituting the clutch mechanism as seen from below.

The clutch mechanism 22 includes a first clutch plate 54 drivably connected to the rotating drive shaft 18 of the electric motor 12 through the planetary gear mechanism 20, and a second clutch plate 56 fixed and drivably connected to the solid shaft portion 38 of the output shaft 16. The first clutch plate 54 and the second clutch plate 56 are each disposed to be rotatable about a rotation axis R. The second clutch plate 56 is disposed to face the first clutch plate 54. As shown in FIGS. 5 and 6, the first clutch plate 54 has radially extending retaining grooves 58 formed in a facing surface 55 facing the second clutch plate 56. The retaining grooves 58 are configured to rotatably retain therein circular columnar engagement members (engagement projections) 60 extending in the radial direction to the rotation axis R. In the second clutch plate 56, two inner retaining holes (small-diameter retaining holes) 62 extending therethrough in the direction of the rotation axis R and two outer retaining holes (large-diameter retaining holes) 64 extending therethrough in the direction of the rotation axis R are formed. The outer retaining holes 64 are positioned more radially outward than the inner retaining holes 62. The outer retaining holes 64 are larger in diameter than the inner retaining holes 62. The inner retaining holes 62 are configured to retain small-diameter spherical engagement members (engagement members) 66, respectively, and the outer retaining holes 64 are configured to retain large-diameter spherical engagement members (engagement members) 68, respectively, which are larger in diameter than the small-diameter spherical engagement members 66. It should, however, be noted that only one of the two types of engagement members is used. That is, on assembly of the electric motor-driven screwdriver 1, one of the two types of engagement members, i.e., the small-diameter spherical engagement members 66 corresponding to the inner retaining holes 62 and the large-diameter spherical engagement members 68 corresponding to the outer retaining holes 64, are selected, and only the selected engagement members are disposed in the corresponding retaining holes, respectively. In FIGS. 1 and 3, the large-diameter spherical engagement members 68 are selectively disposed in the outer retaining holes 64, respectively. As shown in FIG. 6, on the facing surface 55 of the first clutch plate 54, an inner engagement surface 55a configured to engage the small-diameter spherical engagement members 66 when they are disposed in the inner retaining holes 62 and an outer engagement surface 55b configured to engage the large-diameter spherical engagement members 68 when they are disposed in the outer retaining holes 64 are formed. The inner engagement surface 55a projects toward the second clutch plate 56 more than the outer engagement surface 55b by an amount corresponding to the difference in diameter between the small-diameter spherical engagement members 66 and the large-diameter spherical engagement members 68. Thus, the projecting heights of the small-diameter spherical engagement members 66 and the large-diameter spherical engagement members 68 from the second clutch plate 56 become the same when the small-diameter spherical engagement members 66 and the large-diameter spherical engagement members 68 are disposed in the inner retaining holes 62 and the outer retaining holes 64, respectively.

As shown in FIG. 3, the clutch mechanism 22 further includes a displacement member 70 disposed to be displaceable in the direction of the rotation axis R relative to the second clutch plate 56 and the solid shaft portion 38 of the output shaft 16. The displacement member 70 has a slide member 72 configured to slide on the outer peripheral surface 38a of the solid shaft portion 38 in the direction of the rotation axis R, a thrust receiving member 76 rotatable through a bearing 74 relative to the slide member 72, and a sensor pin 80 pressed against the thrust receiving member 76 by a spring 78 so as to be displaced in the direction of the rotation axis R, together with the slide member 72 and the thrust receiving member 76. The thrust receiving member 76 of the displacement member 70 is pressed toward the second clutch plate 56 by a clutch spring 82 through a transmission pin 84. The large-diameter spherical engagement members 68 abut against an engagement surface 72a of the slide member 72 and are therefore urged toward the first clutch plate 54 and the circular columnar engagement members 60 through the thrust receiving member 76 and the slide member 72.

When the cylindrical shaft portion 40 of the output shaft 16 is pushed in as shown in FIG. 4 and thus the drive of the electric motor 12 is started, the first clutch plate 54, which is drivably connected to the rotating drive shaft 18 of the electric motor 12 through the planetary gear mechanism 20, and the circular columnar engagement members 60 are rotated about the rotation axis R. Consequently, the circular columnar engagement members 60 engage the spherical engagement members 68 in the rotational direction, and a rotational torque is transmitted to the second clutch plate 56 through the spherical engagement members 68. Because the second clutch plate 56 is fixed to the solid shaft portion 38 of the output shaft 16, the rotational torque is transmitted to the output shaft 16. The circular columnar engagement members 60 and the spherical engagement members 68 are engaged with each other through curved surfaces, and when the rotational torque is being transmitted, the spherical engagement members 68 receive a force from the circular columnar engagement members 60 in the direction of the rotation axis R away from the circular columnar engagement members 60. Meanwhile, the spherical engagement members 68 are urged toward the first clutch plate 54 by the clutch spring 82. Therefore, while the force that the spherical engagement members 68 receive from the circular columnar engagement members 60 in the direction of the rotation axis R is within the range of the urging force of the clutch spring 82, the spherical engagement members 68 are not displaced in the direction of the rotation axis R, and the state is maintained where the circular columnar engagement members 60 and the spherical engagement members 68 are engaged with each other in the rotational direction and thus the rotational torque is transmitted.

Figure 7:
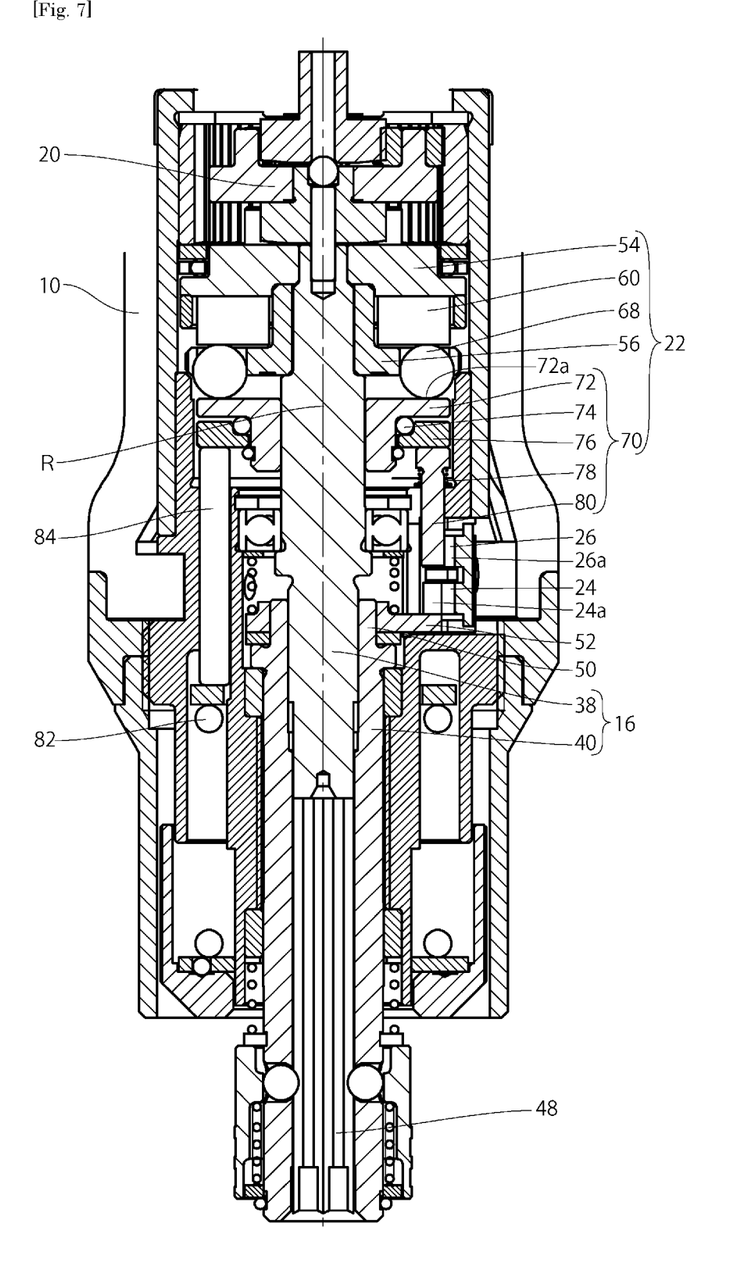
FIG. 7 is an enlarged view of the clutch mechanism and its surroundings showing a state where the clutch mechanism has been released to cancel transmission of a rotational torque.

When the clutch mechanism 22 is acted upon by a load equal to or greater than a predetermined maximum rotational torque, the spherical engagement members 68 are pressed in the direction of the rotation axis R by the circular columnar engagement members 60 and thus displaced in a direction (downward as seen in the figure) away from the first clutch plate 54, together with the displacement member 70, while compressing the clutch spring 82. When the spherical engagement members 68 are displaced to run up onto the circular columnar engagement members 60 completely, as shown in FIG. 7, the engagement between the circular columnar engagement members 60 and the spherical engagement members 68 in the rotational direction is canceled, and the transmission of the rotational torque from the first clutch plate 54 to the second clutch plate 56 is also temporarily canceled. At this time, the sensor pin 80 of the displacement member 70 enters between the light-emitting part and light-receiving part 26a of the braking photoelectric sensor 26. Consequently, the sensor pin 80 partly blocks light emitted from the light-emitting part toward the light-receiving part 26a. In this embodiment, as the amount of light received by the light-receiving part 26a decreases, the output value of the braking photoelectric sensor 26 increases corresponding to the decrease in the amount of received light. Therefore, the computing unit 30 can detect the position of the sensor pin 80 between the light-emitting part and the light-receiving part 26a on the basis of the output value of the braking photoelectric sensor 26. When the output value of the braking photoelectric sensor 26 exceeds a predetermined release determination reference value, the computing unit 30 determines that the clutch mechanism 22 has been released to cancel the transmission of the rotational torque, and stops the drive of the electric motor 12.

In the clutch mechanism 22, the circular columnar engagement members 60 and the spherical engagement members 68 particularly rub against each other while being pressed together by a relatively large force. Therefore, as the electric motor-driven screwdriver 1 is repeatedly used, the circular columnar engagement members 60 and the spherical engagement members 68 gradually become worn. Mutual rubbing also occurs between the spherical engagement members 68 and the slide member 72 and between the slide member 72 and the thrust receiving member 76; therefore, these members are also likely to become worn. If the constituent members of the clutch mechanism 22 are worn in this way, there will be a decrease in the amount of entry of the sensor pin 80 between the light-emitting part and light-receiving part 26a of the braking photoelectric sensor 26 when the rotational torque transmission by the clutch mechanism 22 is canceled as the result of the spherical engagement members 68 running up onto the circular columnar engagement members 60. In the electric motor-driven screwdriver 1, the computing unit 30 monitors the output value of the braking photoelectric sensor 26, and detects the position of the sensor pin 80 between the light-emitting part and the light-receiving part 26a on the basis of the output value of the braking photoelectric sensor 26, thereby determining the wear condition of the clutch mechanism 22.

Figure 8:
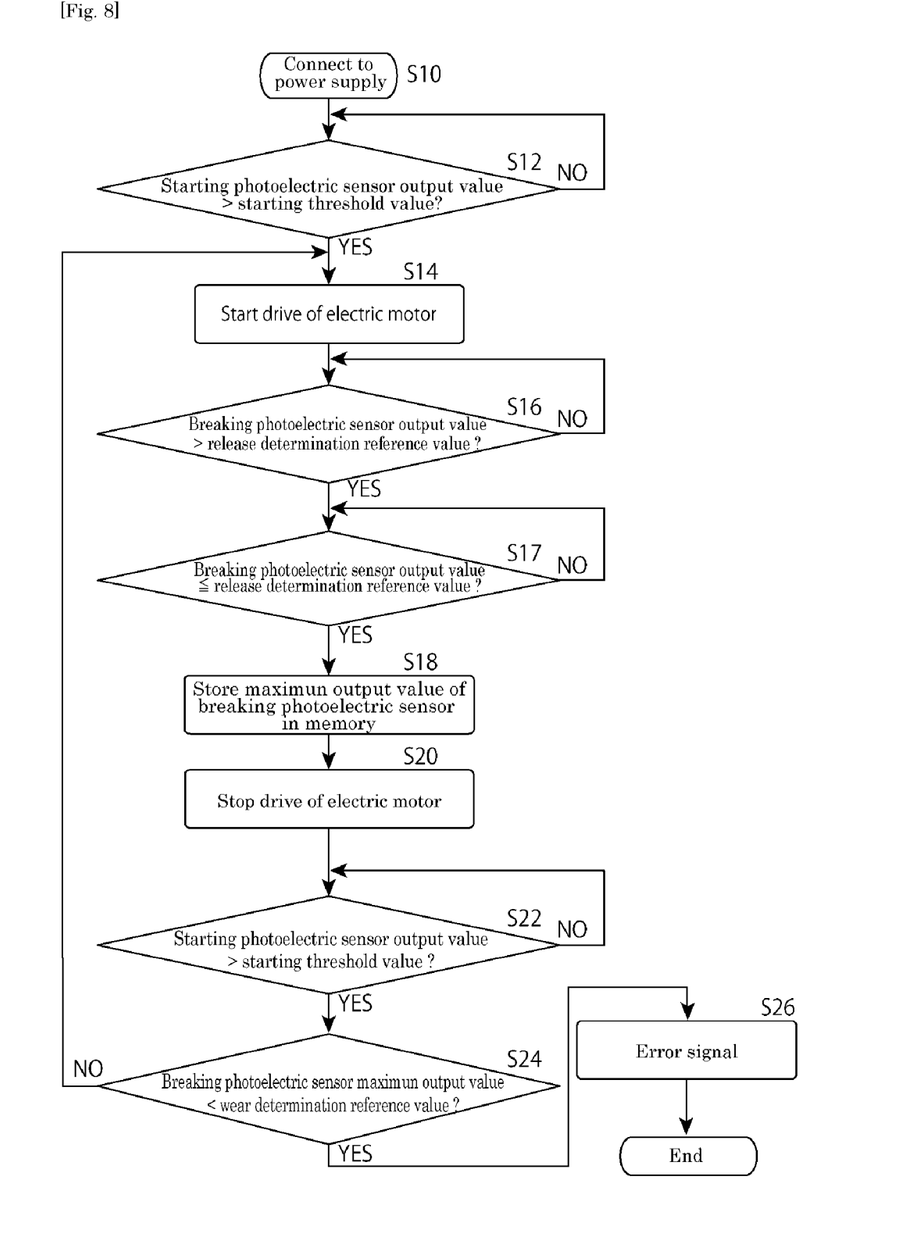
FIG. 8 is a flowchart showing an operation of determining a worn condition.

Determination of the wear condition of the electric motor-driven screwdriver 1 is made specifically by an operation shown in the flowchart of FIG. 8. When the electric motor-driven screwdriver 1 is connected to a power supply, the computing unit 30 is activated (S10). The computing unit 30 monitors the output value of the starting photoelectric sensor 24, and when the output value of the starting photoelectric sensor 24 becomes greater than a predetermined starting threshold value (S12), the computing unit 30 determines that the screwdriver bit attached to the tool mounting part 14 has been pushed in, and starts the rotational drive of the electric motor 12 (S14). Next, the computing unit 30 monitors the output value of the braking photoelectric sensor 26, and when the output value of the braking photoelectric sensor 26 becomes greater than a predetermined release determination reference value (S16) and thereafter returns to a value not greater than the release determination reference value (S17), the computing unit 30 stores in the memory 34 (S18) a maximum output value with the largest difference from the release determination reference value among output values obtained during the period, and stops the drive of the electric motor 12 (S20). The computing unit 30 monitors the output value of the starting photoelectric sensor 24 again, and when the output value of the starting photoelectric sensor 24 changes to a value greater than the starting threshold value (S22), the computing unit 30 compares the maximum output value of the braking photoelectric sensor 26, which has been stored in the memory 34, with a predetermined wear determination reference value (S24). When the maximum output value has increased to equal to or greater than the wear determination reference value, the computing unit 30 determines that the sensor pin 80 has been displaced to a sufficiently large extent and hence the clutch mechanism 22 has not been worn very much, and resumes the drive of the electric motor 12 (S14). On the other hand, if the maximum output value has not reached the wear determination reference value and hence is less than the wear determination reference value, the computing unit 30 determines that the sensor pin 80 has not been displaced sufficiently and hence the clutch mechanism 22 has been worn, and generates an error signal (S26). When the error signal is generated, the error indicator 36 emits light to indicate that the wear of the clutch mechanism 22 has progressed above a certain level. In this case, the drive of the electric motor 12 is not started. It should be noted that the starting photoelectric sensor 24 and the braking photoelectric sensor 26 may be configured such that the output value decreases as the amount of light received by the light-receiving part 26a decreases. In this case, the drive of the electric motor 12 is started when the output value of the starting photoelectric sensor 24 changes to a value less than the starting threshold value. Further, when the output value of the braking photoelectric sensor 26 changes to a value less than the release determination reference value and thereafter returns to a value equal to or greater than the release determination reference value, the computing unit 30 determines that the clutch mechanism 22 has been released, and generates an error signal when a minimum output value with the largest difference from the release determination reference value among output values obtained during the period has not reached a value not greater than the wear determination reference value but is greater than the wear determination reference value. It should be noted that, in the judgment of the wear condition, the progression of wear may be indicated in three or more stages or in an analog, stepless manner on the basis of the output value of the braking photoelectric sensor 26, instead of indicating only two states, i.e., whether or not wear has exceeded a fixed amount.

Figure 9:
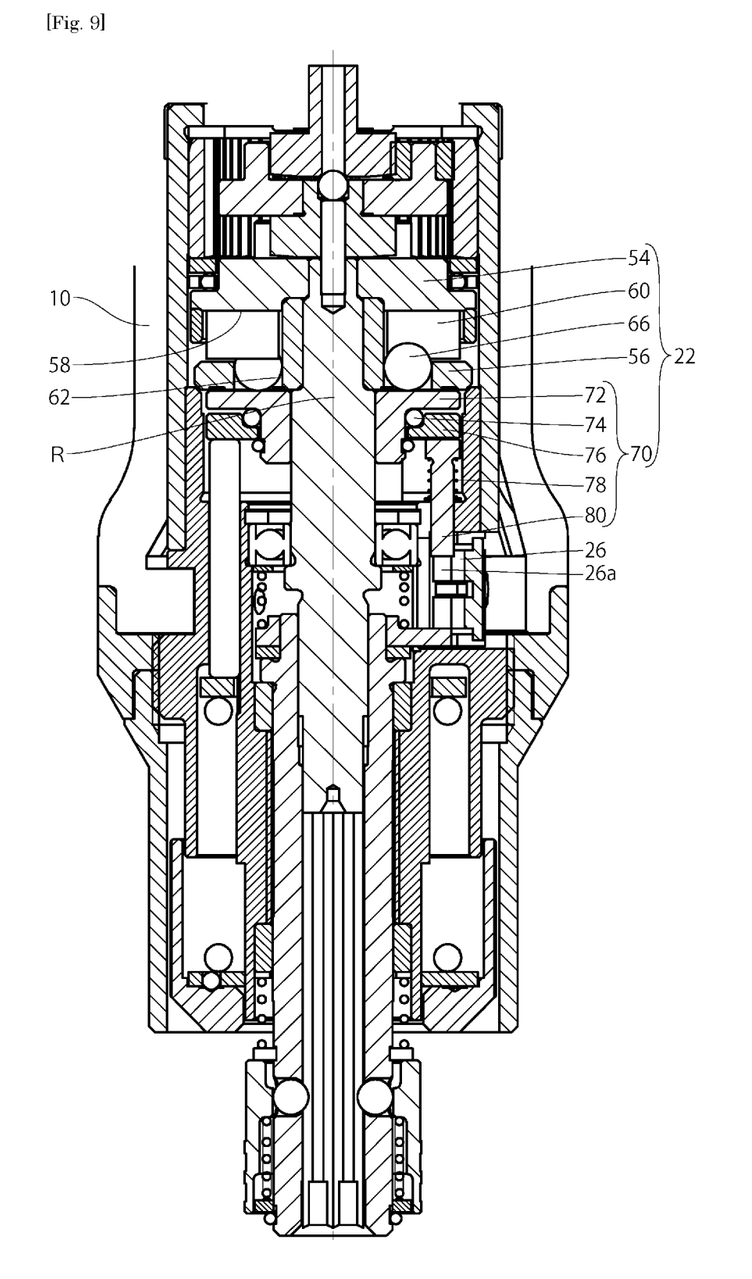
FIG. 9 is an enlarged view showing the clutch mechanism and its surroundings when small-diameter spherical engagement members are disposed in inner retaining holes.
Figure 10:
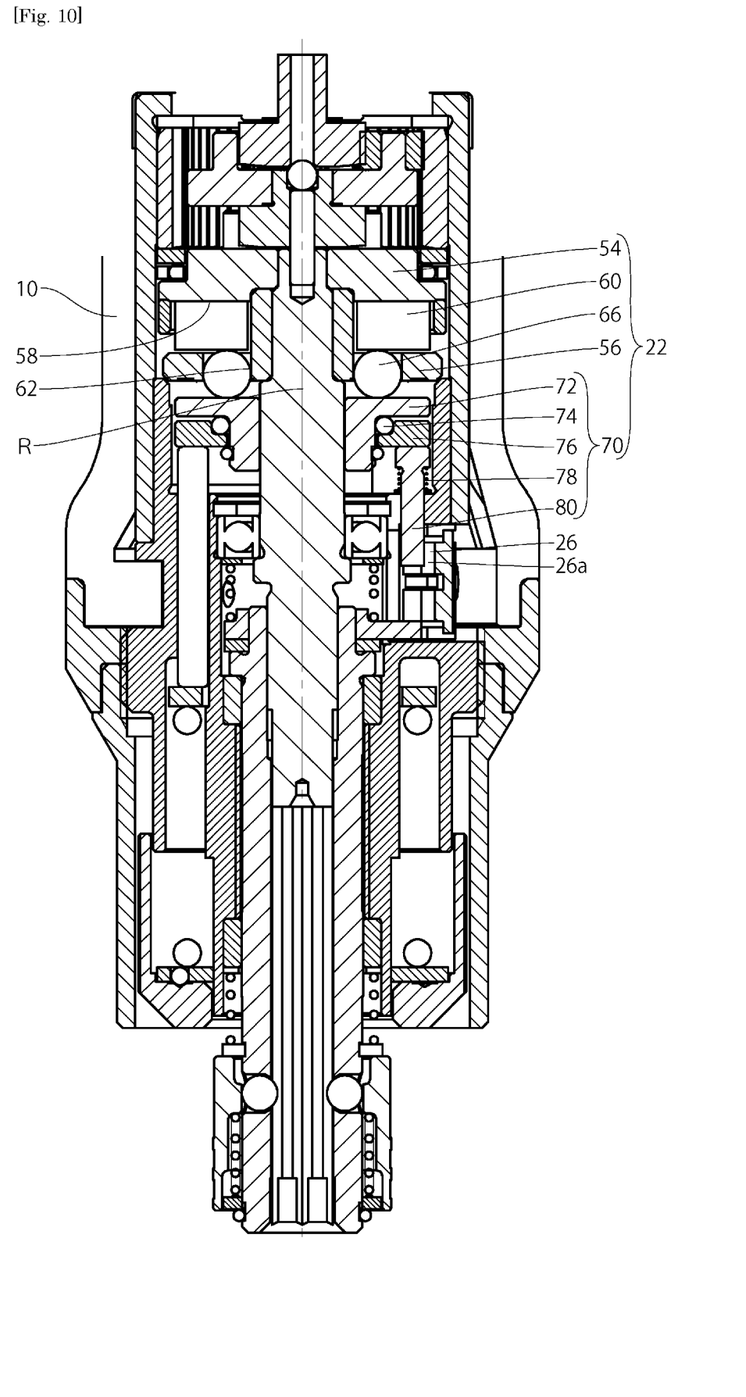
FIG. 10 is an enlarged view of the clutch mechanism and its surroundings in FIG. 9 showing a state where the clutch of the clutch mechanism has been released to cancel transmission of a rotational torque.

As shown in FIGS. 9 and 10, the electric motor-driven screwdriver may be assembled by selectively disposing the small-diameter spherical engagement members 66 in the inner retaining holes 62, respectively, in place of the large-diameter spherical engagement members 68. As has been explained above, the small-diameter spherical engagement members 66 disposed in the inner retaining holes 62 engage the inner engagement surface 55a projecting more than the outer engagement surface 55b at the facing surface 55 of the first clutch plate 54. Consequently, in the state shown in FIG. 9 where the clutch mechanism 22 is not released, the displacement member 70 of the clutch mechanism 22 assumes the same position as that in FIG. 3 where the large-diameter spherical engagement members 68 are disposed. Accordingly, the position of the sensor pin 80 relative to the braking photoelectric sensor 26 is also the same as that in FIG. 3. On the other hand, in the state shown in FIG. 10, where the clutch mechanism 22 has been released, the amount of displacement of the displacement member 70 is smaller than in the arrangement of FIG. 7 where the large-diameter spherical engagement members 68 are disposed. Accordingly, the amount of entry of the sensor pin 80 between the light-emitting part and light-receiving part 26a of the braking photoelectric sensor 26 is smaller than in the case shown in FIG. 7. Therefore, when the small-diameter spherical engagement members 66 are selectively disposed, the release determination reference value and the wear determination reference value are set to smaller values than in the case where the large-diameter spherical engagement members 68 are selectively disposed.

As the amount of displacement of the displacement member 70 is smaller when the clutch mechanism 22 is released, the clutch mechanism 22 can be released with a smaller rotational torque. In addition, as the position at which each spherical engagement member 66, 68 engages the associated circular columnar engagement member 60 is located more radially inward relative to the rotation axis R, the clutch mechanism 22 can be released with a smaller rotational torque. Accordingly, in the electric motor-driven screwdriver 1, the clutch mechanism 22 is released with a smaller rotational torque when the small-diameter spherical engagement members 66 are selectively disposed in the inner retaining holes 62 than when the large-diameter spherical engagement members 68 are selectively disposed in the outer retaining holes 64. In other words, the magnitude of the maximum rotational torque that the clutch mechanism 22 can transmit can be changed by choosing whether to dispose the large-diameter spherical engagement members 68 in the outer retaining holes 64 or the small-diameter spherical engagement members 66 in the inner retaining holes 62. It should be noted that the same engagement members may be used as engagement members to be disposed in the inner retaining holes and those to be disposed in the outer retaining holes by making the inner retaining holes and the outer retaining holes the same size. In this case, since the radial positions at which the engagement members engage the circular columnar engagement members 60 differ from each other, the maximum rotational torque may be set to different magnitudes. Alternatively, the small-diameter retaining holes and the large-diameter retaining holes may be formed at the same position in the radial direction. In this case, the disposed engagement members are different in size, and there is a difference in the amount of displacement of the displacement member 70 until the clutch mechanism is released. Therefore, the maximum rotational torque may be set to different magnitudes. It should, however, be noted that the difference between settable maximum rotational torques can be increased even more by making the retaining holes different from each other in terms of the radial position and moreover making the engagement members different in size, as in the foregoing embodiment.

Although some embodiments of the present disclosure have been explained above, the present disclosure is not limited by these embodiments. For example, the circular columnar engagement members constituting the engagement projections may have a spherical or other shape, for example, instead of circular columnar or may be formed integrally with the first clutch plate as portions projecting from the first clutch plate. The arrangement may also be such that the circular columnar engagement members are drivably connected to the output shaft side, and the engagement members are drivably connected to the input shaft side, so that when the clutch mechanism is released, the displacement member is displaced toward the input shaft side. Further, although in the foregoing embodiments, the power tool according to the present disclosure is explained as an electric motor-driven screwdriver having an electric motor as a drive unit, by way of example, the present disclosure may be applied to electric tools other than the electric motor-driven screwdriver, e.g. an electric motor-driven drill or an electric motor-driven polishing machine, or other power tools such as an air tool having an air motor as a drive unit. In addition, the clutch mechanism may be used in mechanical structures other than power tools.

What is claimed is:

1. A clutch mechanism configured to be disposed between an input shaft and an output shaft to limit a rotational torque transmitted from the input shaft to the output shaft, the clutch mechanism comprising:
   a first clutch plate configured to be drivably connected to one of the input shaft and the output shaft, and the first clutch plate being disposed to be rotatable about a rotation axis and having an engagement projection projecting in a direction of the rotation axis;
   a second clutch plate configured to be drivably connected to an other of the input shaft and the output shaft, the second clutch plate being disposed to face the first clutch plate in the direction of the rotation axis and to be rotatable about the rotation axis, the second clutch plate having an inner retaining hole extending therethrough in the direction of the rotation axis and an outer retaining hole extending therethrough in the direction of the rotation axis, the outer retaining hole being positioned more radially outward than the inner retaining hole;
   an engagement member selectively disposed in one retaining hole of the inner retaining hole and the outer retaining hole, the engagement member being retained in the one retaining hole so as to be displaceable in the direction of the rotation axis; and
   a slide member abutting against the engagement member in the direction of the rotation axis to press the engagement member toward the first clutch plate;
   wherein the clutch mechanism is configured to transmit a rotational torque between the first clutch plate and the second clutch plate through engagement of the engagement member with the engagement projection in a rotational direction, and wherein when a load equal to or greater than a predetermined maximum rotational torque acts, the engagement projection causes the engagement member to be displaced in the direction of the rotation axis, together with the slide member, so as to cancel the engagement between the engagement projection and the engagement member in the rotational direction, thereby canceling transmission of the rotational torque; and
   wherein the maximum rotational torque is greater when the engagement member is selectively disposed in the outer retaining hole than when the engagement member is selectively disposed in the inner retaining hole.

2. The clutch mechanism of claim 1, wherein the outer retaining hole has a diameter larger than that of the inner retaining hole, and the engagement member is a spherical engagement member selected from a small-diameter spherical engagement member corresponding to the inner retaining hole and a large-diameter spherical engagement member larger in diameter than the small-diameter engagement member and corresponding to the outer retaining hole so that the selected spherical engagement member corresponds to the one retaining hole.

3. The clutch mechanism of claim 2, wherein the first clutch plate has an inner engagement surface configured to engage the small-diameter spherical engagement member when the small-diameter spherical engagement member is disposed in the inner retaining hole, and an outer engagement surface configured to engage the large-diameter spherical engagement member when the large-diameter spherical engagement member is disposed in the outer retaining hole, the inner engagement surface projecting toward the second clutch plate more than the outer engagement surface by an amount corresponding to a difference in diameter between the small-diameter spherical engagement member and the large-diameter spherical engagement member.

4. A power tool comprising:
   a drive unit having an input shaft;
   an output shaft having a tool mounting part to which a machining tool is to be mounted; and
   the clutch mechanism of claim 1, the clutch mechanism being disposed between the input shaft and the output shaft.

5. A clutch mechanism configured to be disposed between an input shaft and an output shaft to limit a rotational torque transmitted from the input shaft to the output shaft, the clutch mechanism comprising:
   a first clutch plate configured to be drivably connected to one of the input shaft and the output shaft, the first clutch plate being disposed to be rotatable about a rotation axis and having an engaging projection projecting in a direction of the rotation axis;
   a second clutch plate configured to be drivably connected to an other of the input shaft and the output shaft, the second clutch plate being disposed to face the first clutch plate in the direction of the rotation axis and to be rotatable about the rotation axis, the second clutch plate having a small-diameter retaining hole extending therethrough in the direction of the rotation axis and a large-diameter retaining hole extending therethrough in the direction of the rotation axis, the large-diameter retaining hole having a diameter larger than that of the small-diameter retaining hole;
   an engagement member selected from a small-diameter engagement member corresponding to the small-diameter retaining hole and a large-diameter engagement member corresponding to the large-diameter retaining hole, the large-diameter engagement member having a diameter larger than that of the small-diameter engagement member, the engagement member being disposed in a corresponding one of the small-diameter retaining hole and the large-diameter retaining hole and retained in the corresponding retaining hole so as to be displaceable in the direction of the rotation axis; and a slide member abutting against the engagement member in the direction of the rotation axis to press the engagement member toward the first clutch plate;

wherein the clutch mechanism is configured to transmit a rotational torque between the first clutch plate and the second clutch plate through engagement of the engagement member with the engagement projection in a rotational direction, and wherein when a load equal to or greater than a predetermined maximum rotational torque acts, the engagement projection causes the engagement member to be displaced in the direction of the rotation axis, together with the slide member, so as to cancel the engagement between the engagement projection and the engagement member in the rotational direction, thereby canceling transmission of the rotational torque; and wherein the maximum rotational torque is greater when the large-diameter engagement member is selectively disposed in the large-diameter retaining hole than when the small-diameter engagement member is selectively disposed in the small-diameter retaining hole.

6. A power tool comprising:

a drive unit having an input shaft;

an output shaft having a tool mounting part to which a machining tool is to be mounted; and the clutch mechanism of claim 5, the clutch mechanism being disposed between the input shaft and the output shaft.

\* \* \* \* \*